(12) United States Patent
Henneberger

(10) Patent No.: US 8,186,884 B2
(45) Date of Patent: May 29, 2012

(54) ROLLING BEARING HAVING TWO INNER RINGS AND A SEAL ARRANGEMENT FOR SEALING THE PARTING JOINT BETWEEN THE INNER RINGS

(75) Inventor: Wolfram Henneberger, Memmelsdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 653 days.

(21) Appl. No.: 12/303,733

(22) PCT Filed: May 31, 2007

(86) PCT No.: PCT/DE2007/000977
§ 371 (c)(1),
(2), (4) Date: Feb. 23, 2009

(87) PCT Pub. No.: WO2007/140750
PCT Pub. Date: Dec. 13, 2007

(65) Prior Publication Data
US 2009/0162000 A1 Jun. 25, 2009

(30) Foreign Application Priority Data
Jun. 7, 2006 (DE) .......................... 10 2006 026 443

(51) Int. Cl.
*F16C 33/76* (2006.01)
*F16C 33/78* (2006.01)
*F16C 33/60* (2006.01)

(52) U.S. Cl. .................... 384/477; 384/551; 384/571

(58) Field of Classification Search .................. 384/473, 384/477–478, 484, 486, 489, 551, 570, 571; 277/412
See application file for complete search history.

(56) References Cited

U.S. PATENT DOCUMENTS

| | | | |
|---|---|---|---|
| 2,128,668 A * | 8/1938 | Baker | 384/570 |
| 3,029,082 A * | 4/1962 | Horger | 277/412 |
| 3,669,474 A | 6/1972 | Bode | |
| 4,702,626 A * | 10/1987 | Scholl et al. | 384/489 |
| 4,798,482 A * | 1/1989 | Kruk | 384/571 |
| 4,997,294 A * | 3/1991 | Hillmann | 384/484 |
| 5,492,419 A * | 2/1996 | Miller et al. | 384/477 |
| 6,039,319 A | 3/2000 | Coonce et al. | |
| 6,224,266 B1 * | 5/2001 | Ohtsuki et al. | 384/571 |
| 6,457,870 B2 * | 10/2002 | Aizawa et al. | 384/477 |

(Continued)

FOREIGN PATENT DOCUMENTS

| | | |
|---|---|---|
| DE | 36 21 381 A1 | 1/1988 |
| DE | 39 15 624 A1 | 11/1990 |
| DE | 199 35 014 A1 | 2/2000 |
| EP | 0 645 573 Y | 3/1995 |

(Continued)

*Primary Examiner* — Marcus Charles
(74) *Attorney, Agent, or Firm* — Lucas & Mercanti, LLP; Klaus P. Stoffel

(57) ABSTRACT

The seat adjustment mechanism has a housing with an outer ring and an inner ring. The rings are arranged concentrically. Clamping bodies interact with double clamping ramps on the rings and are arranged in an annular space between the rings. Spring supports pivot in relation to each other, interact with a stop on the housing, are arranged concentrically with the rings, and engage in each case both in the annular space and in an inner space arranged radially within the inner ring. The spring supports are braced in relation to each other by a spring, which is arranged in the inner space to secure the clamping bodies in the center of the double clamping ramps. Stop surfaces of the spring supports are acted upon by a force in the direction in which they are minimally spaced apart.

13 Claims, 1 Drawing Sheet

U.S. PATENT DOCUMENTS

| | | | |
|---|---|---|---|
| 6,851,863 B2 * | 2/2005 | Yokota et al. | 384/473 |
| 7,121,728 B2 * | 10/2006 | Pete et al. | 384/477 |
| 7,220,059 B2 * | 5/2007 | Gobel et al. | 384/571 |
| 7,419,306 B2 * | 9/2008 | Miki et al. | 384/477 |
| 2005/0232528 A1 * | 10/2005 | Gobel et al. | 384/571 |

FOREIGN PATENT DOCUMENTS

| | | | |
|---|---|---|---|
| JP | 10078037 A | * | 3/1998 |
| JP | 11 321211 Y | | 11/1999 |
| JP | 2002155957 A | | 5/2002 |
| WO | 9742425 A1 | | 11/1997 |

* cited by examiner

ROLLING BEARING HAVING TWO INNER RINGS AND A SEAL ARRANGEMENT FOR SEALING THE PARTING JOINT BETWEEN THE INNER RINGS

This application is a 371 of PCT/DE2007/000977 filed May 31, 2007, which in turn claims the priority of DE 10 2006 026 443.6 filed Jun. 7, 2006, the priority of both applications is hereby claimed and both applications are incorporated by reference herein.

FIELD OF THE INVENTION

The invention relates to a rolling bearing having at least one outer ring and a multipart inner ring between which rolling bodies are arranged, wherein two adjacent inner rings bear closely against each other with their axial end sides which point toward each other, and in which a ring seal is arranged in a common annular groove of the inner rings, which annular groove is formed by indentations in the region of the end sides, which point toward each other, of the inner rings.

BACKGROUND OF THE INVENTION

A rolling bearing of this type is known for example from DE 199 35 014 A1. This rolling bearing is embodied as a quadruple-row tapered roller bearing in which the rolling bodies are arranged between a plurality of inner rings and outer rings of the bearing. The tapered roller bearing has axially and radially acting sealing means, the radially acting sealing means sealing a gap between two inner rings which bear against each other with their end sides.

The ring seal is arranged in a plurality of exemplary embodiments in all cases on the radial inner side of the two inner rings in a common annular groove formed by indentations in the region of the end sides, which point toward each other, of the two inner rings. The common annular groove, formed by these indentations, for receiving the ring seal has in this context a respective rectangular cross-sectional geometry.

To achieve desired sealing properties, which also permit a compensation of pressure between the interior of the bearing and the environment or allow ventilation of said interior, the ring seal, which is embodied differently in variants, comprises in each case a metallic tensioning element which exerts a radial contact force on the ring seal in the direction toward the inner rings forming the annular groove and secures said ring seal in the annular groove and also permits a pressure compensation. In this respect, the known ring seals are all comparatively expensive rubber/metal components which, owing to their construction therein, do not allow a hermetic seal of the interior of the rolling bearing.

WO 97/42425 A1 also discloses a double-row tapered roller bearing which, as a wheel bearing, is integrated in a wheel hub of a vehicle. The two-part inner ring of this tapered roller bearing is protected from an infiltration of undesired substances, such as for example oil from the region of a vehicle axle, by means of a sealing system which covers the mutually abutting end sides of the two inner rings and is arranged in the bearing interior. This sealing system consists of two O-rings, of which each O-ring is formed in an associated annular groove on the outer circumference of the respective inner rings. The two O-rings are in addition radially surrounded by a metallic ring which presses said O-rings against the associated inner rings in a sealing manner.

A construction comparable thereto is displayed by a quadruple-row rolling bearing which is known from DE 39 15 624 A1, although use is made therein, not of O-rings, but rather of differently configured sealing means which are inserted into a common annular groove, which is rectangular in cross section, on the inner rings and held by a sheet metal ring.

Finally, DE 36 21 381 A1 discloses a double-row rolling bearing having multipart inner rings and outer rings. In the case of this rolling bearing, the outer rings are set axially apart from one another by means of a spacer ring, whereas the inner rings are connected by means of a fastening ring which is U-shaped in cross section and the arms of which engage with respectively associated circumferential grooves in the inner rings.

The previously known rolling bearings having two inner rings bearing closely against each other at the end side display only an insufficient seal of the receiving space for the rolling body thereof, so that in an undesired manner lubricant can issue from the rolling bearing or foreign substances can infiltrate. In both cases, the properties are likely to be impaired and the service life of the rolling bearing curtailed. Certain embodiments are criticized for example for inadequate axial bracing of the two inner rings relative to each other, so that in the region of the parting joint thereof between the end sides thereof foreign substances can overcome the seal arranged there. Insofar as in other embodiments the seal can be pressed against the inner rings, by means of a separate sheet metal ring or by way of a sheet metal ring incorporated in the rubber material thereof, with an effect sufficient for sealing purposes, these ring seals are judged to be comparatively expensive to manufacture.

OBJECT OF THE INVENTION

Against this background, the invention is based on the object of providing a generic rolling bearing, the interior of which is hermetically sealed, in particular in the region of the end-side parting joint between two of its bearing rings, against the infiltration of foreign substances and/or the outflow of lubricant. The rolling bearing should in this case, with regard to the seal arrangement, have, in a technically simple manner and in order to achieve beneficial manufacturing costs, as few individual parts as possible.

SUMMARY OF THE INVENTION

The invention is based on the realization that the object set can be achieved by a rolling bearing having a common receiving groove which is embodied in a geometrically specific manner, is formed in the region of the mutually abutting end sides of the inner rings of the rolling bearing and into which—owing to the specific geometry of the receiving groove—a ring seal can be received in a self-securing and self-sealing manner.

According to the invention, the object set is achieved by a rolling bearing having at least one outer ring and a multipart inner ring between which rolling bodies are arranged, wherein two adjacent inner rings bear closely against each other with their axial end sides which point toward each other, and in which a ring seal is arranged in a common annular groove of the inner rings, which annular groove is formed by indentations in the region of the end sides, which point toward each other, of the inner rings.

According to the invention, provision is additionally made for the common annular groove to have, viewed in cross section, a greater axial length in the region of its base than in the radially outer region of the annular groove.

Therefore, according to the invention, just by means of a simply and material-efficiently manufactured ring seal—received in the common annular groove—a hermetically sealed and self-secured seal arrangement is provided, which reliably and in a simple manner prevents infiltration of foreign substances and/or migration of lubricant via the mutually abutting end sides of the inner rings into or out of that space of the rolling bearing in which the rolling bodies are arranged.

In a corresponding reversal, with the same advantageous actions and effects, the invention can also be carried out on a divided outer ring.

Particularly preferably, provision may also be made for an undercut to be formed at least in one of the indentations, in particular in both indentations. During fitting of the ring seal, said ring seal can enter this undercut or these undercuts in a sealing manner.

Furthermore, provision may preferably be made for the common annular groove to have, viewed in cross section, the greater axial length in the region of its base than in the region of its radial opening.

A further feature of the rolling bearing is in this connection that the constricted radial opening of the common annular groove is formed by radially external and axially oriented annular webs on the indentations of the inner rings.

A further advantageous feature of a rolling bearing according to the invention is that the indentations in the region of the end sides of the respective inner rings, which after all form the common annular groove for receiving the ring seal, are each embodied differently, i.e. have a different axial and/or radial length or depth. This construction facilitates, in particular in the case of different axial lengths, the sliding of the ring seal onto the two inner rings or into the common annular groove; this will be examined in greater detail hereinafter in conjunction with a specific exemplary embodiment.

The cross-sectional geometry of the ring seal, which can in particular interact, as proposed, with the geometry of the annular groove, also has a supportive effect.

In particular, it may in this case be particularly preferable at least in the region of the indentations of the inner rings for the ring seal to be in contact with the inner rings—a contact surface in the region of the undercut or the undercuts is in particular provided here—and at least one axial end face of the ring seal to have, at least in the region of contact, in particular of the undercuts, prior to insertion of the ring seal into the common annular groove, a flat, radially outwardly extending surface.

Furthermore, provision may in this case be made for both axial end faces of the ring seal each to have, at least in the region of contact prior to insertion of the ring seal into the common annular groove, a flat, radially outwardly extending surface.

A further feature can in this case be for the flat, radially outwardly extending surface on the end side of the ring seal to extend radially outward at least a certain amount further than the undercut or the undercut annular web on the corresponding inner ring.

With regard to the selection of the material for the ring seal, it is preferable for the ring seal to be made of a rubbery resilient material. This allows the ring seal to nestle into the undercuts particularly effectively.

This proposed geometry of the ring seal—in interaction with the geometry according to the invention of the common annular groove—leads on the one hand to very good sealing properties and on the other hand to self-securing of said ring seal in the annular groove so that, in contrast to known generic rolling bearings, no additional sheet metal rings or ring seals with an integrated metal ring, radially surrounding the ring seal, have to be used.

In order to axially secure the two inner rings relative to each other, a clasp-like sheet metal ring, which engages radially with annular grooves of the mutually abutting inner rings, can be fastenable to the side of the inner rings that points away from the interior of the bearing.

In a constructionally specific embodiment of a rolling bearing according to the invention, provision may be made for the ring seal to have a radially inner portion comprising a right, straight annular web and a left, straight annular web and also a radially outer portion comprising a right annular web and a left annular web, and for a respective right constriction, similar to a groove, or a left constriction, similar to a groove, to be formed between these annular webs, the radially inner annular webs being for the most part inserted axially into the end-side indentations of the adjacent inner rings. A part extending therebeyond of straight radially inner annular webs can additionally be provided.

According to one embodiment of a rolling bearing constructed in accordance with the invention, provision may be made for said rolling bearing to be embodied as a multiple-row tapered roller bearing with obliquely positioned rolling bodies in an O-shaped arrangement or X-shaped arrangement, having at least one outer ring—two outer rings may also be provided in this case—and two inner rings, in which the inner rings are held axially to each other by means of an annular clasp. The annular clasp has preferably a U-shaped cross section and is inserted with in each case one of its arms into a respective circumferential groove on the side, which is remote from the rolling bodies, and also the side, which is remote from the ring seal, of the respective inner rings.

With regard to the material selected for the clasp, it is preferable for the clasp to be made of a metallic material.

Another embodiment of a generic rolling bearing having two outer rings bearing closely against each other on the end side and a seal according to the invention arranged or embodied there is accordingly also technically possible. The clasp is then fastened radially outwardly to the two outer rings in order to axially secure said outer rings relative to each other.

Finally, it should be noted that the rolling bearing according to the invention also has sealing means which are known per se and axially seal the receiving space for the rolling bodies.

The invention will be described hereinafter in greater detail based on an exemplary embodiment and with reference to the appended drawings, in which.

DETAILED DESCRIPTION OF THE DRAWINGS

Figure 1:
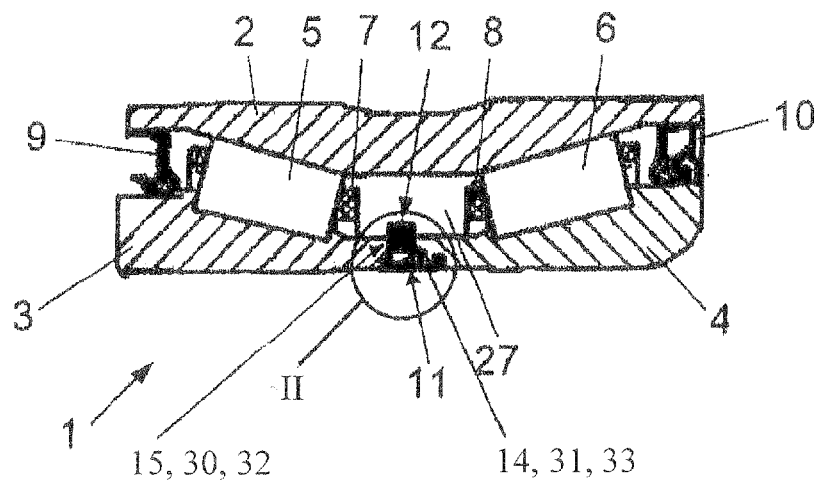
FIG. 1 is a schematic cross section through a double-row tapered roller bearing.

The rolling bearing 1 illustrated in FIG. 1 is accordingly embodied as a double-row tapered roller bearing, although it could equally well be a different type of rolling bearing having at least one outer ring 2 and at least two inner rings 3, 4 bearing closely against one another on the end side.

Rolling bodies 5, 6, which are embodied as tapered rollers, are arranged in the receiving space 27 which is formed by these bearing rings 2, 3, 4 and is axially sealed by sealing means 9, 10, which are known per se and made of rubber and sheet metal, against infiltration of foreign substances and issuing of lubricant, the rolling bodies 5, 6 of each row being held in a separate cage 7 and 8.

The two inner rings 3, 4 have in the region of their end sides 25 and 26 respectively, which point toward each other, on the radial inner side, i.e. remote from the raceways for the rolling bodies 5 and 6, a respective radial groove into which the arms of a U-shaped sheet metal ring, as an annular clasp 11, are inserted. This clasp 11 connects the two inner rings 3 and 4 substantially axially to each other, so that said inner rings cannot move apart from each other even under the action of the axial force component of the tapered rolling bodies 5, 6.

Figure 2:
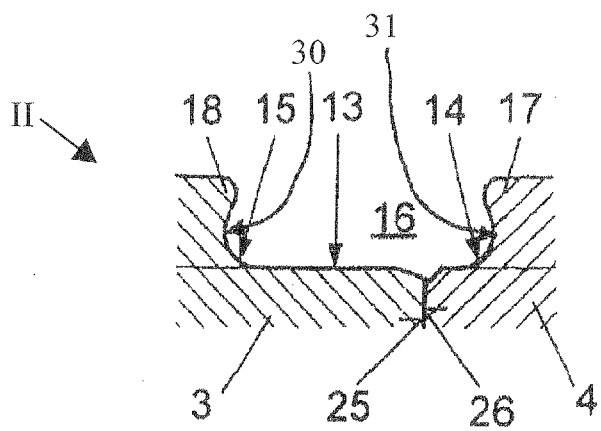
FIG. 2 shows an annular groove in the tapered roller bearing according to the detail II of FIG. 1 for receiving a ring seal.
Figure 3:
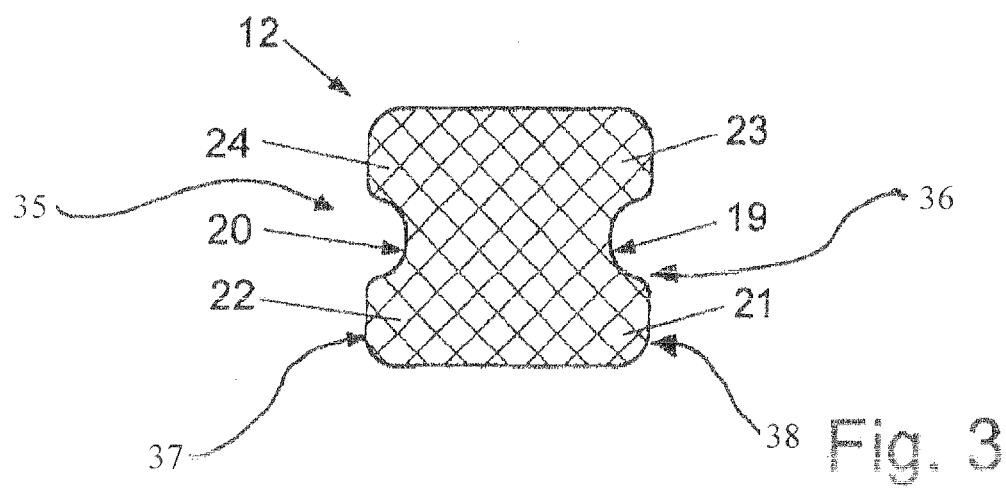
FIG. 3 is a cross section through the ring seal.

As is illustrated in particular by the enlargement of the detail of the region II of FIG. 1 in FIG. 2, there is formed radially above the clasp 11 on the opposing radial outer side of the two inner rings 3 and 4, i.e. within the receiving space 27 for receiving the rolling bodies 5 and 6, in the region of the end sides 25, 26, which point toward each other, of the inner rings 3, 4, a respective indentation 14 and 15 which differ in length in the axial direction and form a common annular groove 16 for receiving the ring seal 12 illustrated in FIG. 3.

As FIG. 2 clearly shows, the common annular groove 16 has in the region of its radially inner base 13 a greater axial length than in the radially outer region of its therefore constricted opening. The aforementioned constriction of the common annular groove 16 is formed by in each case an axial undercut annular web 17 or 18 at the radially outwardly extending end of the indentations 14 and 15, respectively.

FIG. 3 illustrates a configuration of the ring seal 12.

As FIG. 3 shows, this ring seal 12 has—in cross section—a substantially rectangular form having an axial constriction 19, 20 on both sides. There are thus formed in the case of the ring seal 12 a radially inner portion having a right, straight annular web 21 and a left, straight annular web 22 and also a radially outer portion having a right annular web 23 and a left annular web 24.

With its radially inner axial and straight annular webs 21 and 22, the ring seal 12 can be inserted, so as to produce a very effective seal and be secure against detachment, into the indentations 14, 15 of the inner rings 3, 4 or into the undercuts 30, 31 of the undercut annular webs 17, 18 of the inner rings 3, 4, wherein—in their radially lower regions—the corresponding, straight contact surfaces of the ring seal 12 nestle into the respective undercuts 30, 31 so as to produce a seal and in a self-securing manner. Moreover, the flat, radially outwardly extending surfaces 21, 22 on the end sides of the ring seal 12 protrude at least a certain amount further radially outwardly than the undercuts 30, 31.

As the ring seal 12 is preferably inserted before the two inner rings 3 and 4 are joined together by means of the clasp 11, the axially longer base portion of the inner ring 3 offers the ring seal 12, after axial sliding onto the inner ring 3 for further mounting steps of the rolling bearing 1, a secure hold there.

As soon as the end side 25 of the second inner ring 4 is then placed against the end side 26 of the inner ring 3 and axially secured by insertion of the clasp 11, the ring seal 12 is located in the common annular groove 16 so as to be secured against detachment, as in their lower regions the radially inner axial and straight annular webs and 22 of the ring seal 12 nestle—with their straight end walls—into the undercuts 30, 31 formed in the inner rings 3, 4 or the annular webs 17, 18 of the inner rings 3, 4.

The described construction of the rolling bearing 1, in particular with regard to the seal arrangement thereof, reliably prevents, with comparatively low production costs while at the same time saving material, any foreign substances from infiltrating the receiving space 27 for the rolling bodies 5, 6, or lubricant from escaping therefrom, through the gap between the mutually abutting end sides 25, 26 of the two inner rings 3, 4.

In a specific application in which the rolling bearing 1 is used as a wheel bearing on a rear axle of a commercial vehicle, the infiltration of oil from the rear axle transmission into the receiving space 27 for the rolling bodies can therefore be reliably prevented.

LIST OF REFERENCE NUMERALS

1 Rolling bearing
2 Outer ring
3 First inner ring
4 Second inner ring
5 Rolling body
6 Rolling body
7 Cage
8 Cage
9 Axial sealing means
10 Axial sealing means
11 Annular clasp
12 Ring seal
13 Base of the annular groove 16
14 Indentation in the inner ring 3
15 Indentation in the inner ring 4
16 Common annular groove
17 Undercut annular web on the inner ring 4
18 Undercut annular web on the inner ring 3
19 Right constriction on the sealing means or on the ring seal 12
20 Left constriction on the sealing means or on the ring seal 12
21 Right, straight annular web on the ring seal 12, radially inward
22 Left, straight annular web on the ring seal 12, radially inward
23 Right annular web on the ring seal, radially outward
24 Left annular web on the ring seal, radially outward
25 End side of the inner ring 4
26 End side of the inner ring 3
27 Receiving space for the rolling bodies
30 Undercut on the inner ring 3 or on the undercut annular web 18
31 Undercut on the inner ring 4 or on the undercut annular web 17
32 Contact or contact surface, inner ring 3 to ring seal 12
33 Contact or contact surface, inner ring 4 to ring seal 12
35 First axial end side of the ring seal 12
36 Second axial end side of the ring seal 12
37 Flat, radially outwardly extending surface on the end side 35
38 Flat, radially outwardly extending surface on the end side 36

The invention claimed is:
1. A rolling bearing comprising:
at least one outer ring;
a multipart inner ring comprising two adjacent inner rings bearing against each other, each of the inner rings have an end side which point toward each other, a raceway, and an indentation forming an annular groove between the inner rings, the indentation is formed in a region of each of the inner rings that faces the outer ring;
rolling bodies arranged between the outer ring and the inner rings; and
a ring seal arranged in the annular groove of the inner rings, wherein the annular groove has, viewed in axial cross-section, a greater axial length in region of the base of the annular groove than in a radially outer region of the annular groove.

2. The rolling bearing of claim 1, wherein the indentation of at least one of the rings has an undercut.

3. The rolling bearing of claim 1, wherein the annular groove has, viewed in axial cross-section, the greater axial length in the region of the base than in a region of a radial opening of the annular groove.

4. The rolling bearing of claim 1, wherein the annular groove has a constricted radial opening formed by radially external and axially oriented annular webs on the indentation of each of the inner rings.

5. The rolling bearing of claim 1, wherein, at least in the region of the indentation of each of the inner rings, the ring seal is in contact with the inner rings, and at least one axial end face of the ring seal has, at least in a region of contact prior to insertion of the ring seal into the annular groove, a flat, radially outwardly extending surface.

6. The rolling bearing of claim 1, wherein the ring seal has axial end faces, which each have, at least in a region of contact prior to insertion of the ring seal into the annular groove, a flat, radially outwardly extending surface.

7. The rolling bearing of claim 1, wherein ring seal has a radially inner portion comprising a right annular web and a left annular web, a radially outer portion comprising a right annular web and a left annular web, a right constriction and a left constriction is formed between the annular webs of the inner portion and the outer portion, a first radial end face extending entirely linearly between the right annular web and the left annular web of the radially inner portion, and a second radial end face extending linearly between the right annular web and the left annular web of the radially outer portion the ring seal being substantially inserted axially into the annular groove of the inner rings.

8. The rolling bearing of claim 1, wherein the ring seal is made of a resilient rubber material.

9. The rolling hearing of claim 1, wherein the rolling bearing is a multiple-row tapered roller bearing, the rolling bodies are obliquely positioned in an O-shaped arrangement or X-shaped arrangement, and the inner rings are held axially adjacent to each other by means of an annular clasp.

10. The rolling bearing of claim 9, wherein the annular clasp, which is made of metallic material, has a U-shaped cross-section and is inserted into a circumferential groove on a side of each of the inner rings, which is remote from the rolling bodies and remote from the ring seal.

11. The rolling bearing of claim 1, wherein the indentations on the end side of each of the inner rings have a different axial and/or radial length or depth.

12. The rolling hearing of claim 1, further comprising sealing means which axially seal a receiving space between the rolling bodies.

13. The rolling bearing of claim 1, wherein the indentation in both of the inner rings has an undercut.

* * * * *